(12) United States Patent
Tirupattur Saravanan et al.

(10) Patent No.: US 10,834,215 B1
(45) Date of Patent: Nov. 10, 2020

(54) PROVIDING IMPRESSION INFORMATION TO ATTRIBUTION SYSTEMS USING SYNCHRONIZED USER IDENTIFIERS

(71) Applicant: Facebook, Inc., Menlo Park, CA (US)

(72) Inventors: Sanjay Kanaka Sai Tirupattur Saravanan, Fremont, CA (US); Andrew Knox, Brooklyn, NY (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/259,911

(22) Filed: Jan. 28, 2019

(51) Int. Cl.
*H04L 29/08* (2006.01)
*G06Q 30/02* (2012.01)

(52) U.S. Cl.
CPC ......... *H04L 67/22* (2013.01); *G06Q 30/0201* (2013.01); *G06Q 30/0202* (2013.01); *H04L 67/306* (2013.01)

(58) Field of Classification Search
CPC ........... G06Q 30/0201; G06Q 30/0202; G06Q 30/0243; G06Q 30/0254; G06Q 30/0269; G06Q 30/02; G06Q 50/01; H04L 67/22; H04L 67/306; H04N 21/2187; H04W 4/029; H04W 4/21
See application file for complete search history.

(56) References Cited

U.S. PATENT DOCUMENTS

| | | | |
|---|---|---|---|
| 2016/0027037 A1* | 1/2016 | Cai | G06Q 30/0243 705/14.42 |
| 2016/0342699 A1* | 11/2016 | Shen | G06Q 30/0269 |
| 2018/0165688 A1* | 6/2018 | Ismail | G06Q 30/02 |
| 2018/0293615 A1* | 10/2018 | Demsey | H04W 4/029 |
| 2018/0295199 A1* | 10/2018 | Heffernan | H04L 67/22 |
| 2018/0365710 A1* | 12/2018 | Halecky | G06Q 30/0254 |
| 2019/0050874 A1* | 2/2019 | Matlick | G06Q 30/0201 |
| 2019/0109914 A1* | 4/2019 | Miller | H04W 4/21 |
| 2019/0114362 A1* | 4/2019 | Subbian | G06Q 50/01 |
| 2019/0139094 A1* | 5/2019 | Kirti | G06Q 30/0269 |
| 2019/0253745 A1* | 8/2019 | Sheehan | H04N 21/2187 |

* cited by examiner

*Primary Examiner* — Le H Luu
(74) *Attorney, Agent, or Firm* — Fenwick & West LLP

(57) ABSTRACT

An online system receives a list of third party user identifiers from a third party attribution system, each associated with one or more user action events by each of a set of users across multiple content providers. The online system determining if it has its own user identifiers that match to at least a subset of the received third party user identifiers. The online system determines relevant impressions corresponding to the matching online system user identifiers, and sends them to the third party attribution system along with an associated subset of the third party user identifiers.

20 Claims, 4 Drawing Sheets

|   | a | b | c | d |
|---|---|---|---|---|
|   | Third party User IDs 410 | Online System ID 420 | Impressions 430 | Content Provider 405 |
| 1 | CP A ID | abc | 1001 | 150a |
| 2 | CP A ID | abc | 2301 | 150d |
| 3 | CP B ID | def | 1893 | 150b |
| 4 | CP B ID | def | 2202 | 150e |
| 5 | CP C ID | N/A | ▮▮▮ | ▮▮▮ |
| 6 | CP D ID | ghi | 2309 | 150a |

FIG. 4

PROVIDING IMPRESSION INFORMATION TO ATTRIBUTION SYSTEMS USING SYNCHRONIZED USER IDENTIFIERS

FIELD OF ART

This disclosure relates generally to online systems, and more specifically to communicating offline and online user activity with respect to content providers.

BACKGROUND

From online systems to live retail locations, users are able to interact with content providers through a number of platforms. Content providers may be interested in keeping track of user habits, often by way of third-party attribution systems.

With an increasing number of users who may interact with content providers across a number of different platforms, content providers are looking to consolidate relevant user activity. There is a need for synchronized user activity tracking across online systems, third-party attribution systems, and content providers without compromising user privacy.

SUMMARY

An online system provides a third-party attribution system user impression data. The impression data is specific to users recorded, by the third-party attribution system, as interacting with a content provider offline, as well as users of the online system. Impressions are also filtered by content providers and sent to the third-party attribution system without online system identifiers. In this way, user identity is protected as well. The third-party attribution system is presented with user impression data that can be used to predict user attribution trends and consumer purchase patterns for content providers.

According to one embodiment, an online system receives a list of third party user identifiers from a third party attribution system, each associated with one or more user action events by each of a set of users across multiple content providers. The online system determining if it has its own user identifiers that match to at least a subset of the received third party user identifiers. The online system determines relevant impressions corresponding to the matching online system user identifiers, and sends them to the third party attribution system along with an associated subset of the third party user identifiers.

BRIEF DESCRIPTION OF THE DRAWINGS

FIG. 4 is a table showing exemplary impression data, according to an embodiment of the invention.

DETAILED DESCRIPTION

System Architecture

Figure 1:
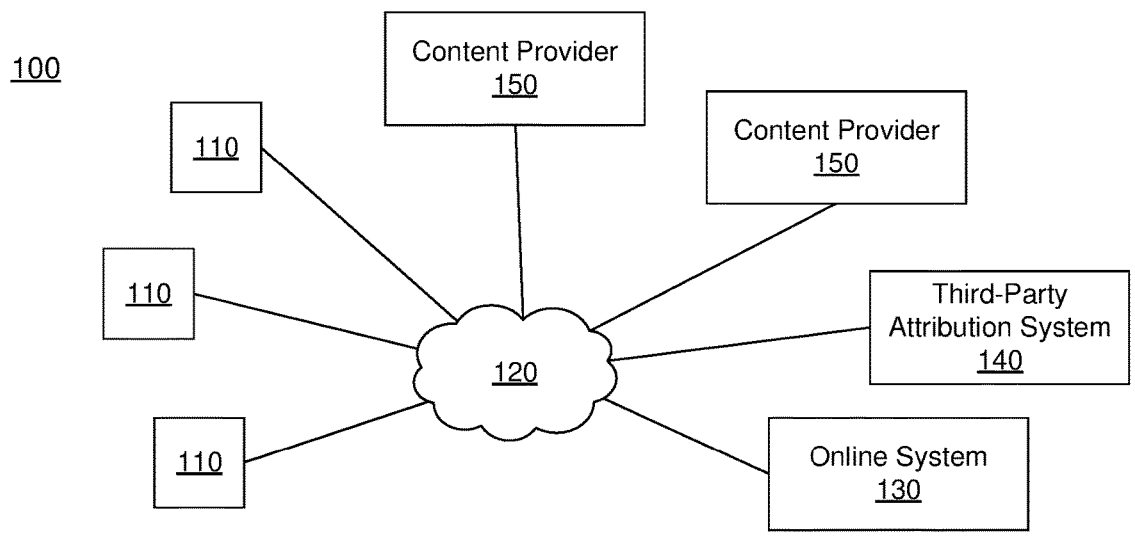
FIG. 1 is a block diagram of a system environment in which an online system operates, in accordance with an embodiment of the invention.

FIG. 1 is a block diagram of a system environment 100 in which user devices 110, a content provider 150, a third party attribution system 140, and an online system 130 operate, in accordance with an embodiment of the invention. The system environment 100 includes one or more users, represented by one or more user client devices 110, one or more content providers 150, a third-party attribution system 140, and an online system 130, all of which communicate over a network 120. In alternative configurations, different and/or additional components may be included in the system environment 100.

The user client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 130. For example, a client device 110 executes a browser application to enable interaction between the client device 110 and the online system 130 via the network 120. In another embodiment, a client device 110 interacts with the online system 130 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party attribution systems 140 may be coupled to the network 120 for communicating with the online system 130, which is further described below in conjunction with FIG. 2. In one embodiment, a third-party system 140 is a content provider, advertiser, or merchant. In other embodiments, a third-party system 140 (e.g., a content publisher) provides content or other information for presentation via a client device 110. A third-party system 140 also may communicate information to the online system 130, such as advertisements, content, or information about an application provided by the third-party system 130. A third-party attribution system 140 records data on users and content providers, as well as data on the interactions between the two. A third-party attribution system 140 may also be referred to as a third-party system herein.

Figure 2:
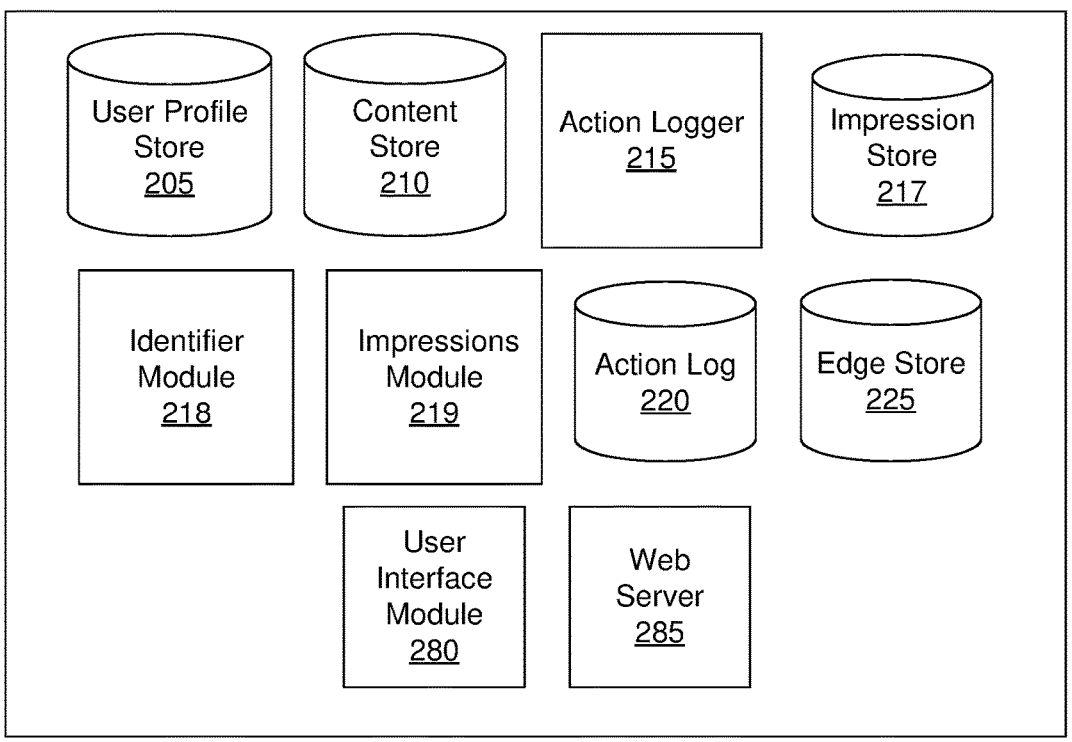
FIG. 2 is a block diagram of the architecture of an online system, in accordance with an embodiment of the invention.

FIG. 2 is a block diagram of the architecture of the online system 130. The online system 130 includes a user profile store 205, a content store 210, action logger 215, impression store 217, identifier module 218, impression module 219, action log 220, edge store 225, user interface module 280, and web server 285. In other embodiments, the online system 130 may include additional, fewer, or different components for various applications. Conventional components such as network interfaces, security functions, load balancers, failover servers, management and network operations consoles, and the like are not shown so as to not obscure the details of the system architecture.

Each user of the online system 130 is associated with a user profile, which is stored in the user profile store 205. A user profile includes declarative information about the user that was explicitly shared by the user and also may include profile information inferred by the online system 130. In one embodiment, a user profile includes multiple data fields, each describing one or more user attributes for the corresponding online system user. Examples of information stored in a user profile include biographic, demographic, and other types of descriptive information, such as work experience, educational history, gender, hobbies or preferences, locations and the like. A user profile also may store other information provided by the user, for example, images or videos. In certain embodiments, images of users may be tagged with information identifying the online system users displayed in an image. A user profile in the user profile store 205 also may maintain references to actions by the corresponding user performed on content items in the content store 210 and stored in the action log 220.

The user profile store 205 also may store user-identifying information associated with users of the online system 130. In some embodiments, user-identifying information associated with a user of the online system 130 may include personally identifiable information. Examples of personally identifiable information that may be associated with a user of the online system 130 may include a full name, a home address, a phone number, an email address, an online system user identifier (e.g., a username, a user identification number, or a cookie identifier), a client device identifier (e.g., an IP address), a browser identifier (e.g., a user agent), etc. User-identifying information also may include information that potentially may be combined with other personal information to identify a user of the online system 130 (e.g., an age, a gender, a geographic region, etc.).

While user profiles in the user profile store 205 are frequently associated with individuals, allowing individuals to interact with each other via the online system 130, user profiles also may be stored for entities such as businesses or organizations. This allows an entity to establish a presence in the online system 130 for connecting and exchanging content with other online system users. The entity may post information about itself, about its products or provide other information to users of the online system 130 using a brand page associated with the entity's user profile. Other users of the online system 130 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a page (e.g., brand page), an advertisement, or any other type of content. Online system users may create objects stored by the content store 210, such as status updates, photos tagged by users to be associated with other objects in the online system 130, events, groups, or applications. In some embodiments, objects are received from content providers separate from the online system 130. In one embodiment, objects in the content store 210 represent single pieces of content, or content "items." Hence, online system users are encouraged to communicate with each other by posting text and content items of various types of media to the online system 130 through various communication channels. This increases the amount of interaction of users with each other and increases the frequency with which users interact within the online system 130.

The content store 210 may store objects representing content items received from content-providing users of the online system 130. Each content item received from a content-providing user may be associated with various types of information that may be used to uniquely identify the content item. For example, a content item may be identified based on information identifying a content-providing user of the online system 130 from whom the content item was received and on a title or other unique identifier assigned to the content item by the content-providing user. As an additional example, a content item may be identified based on a unique identification number assigned by the online system 130 to each content item maintained in the online system 130. In the above examples, the information that may be used to uniquely identify each content item may be stored in association with an object representing the content item in the content store 210.

The action logger 215 receives communications about user actions internal to and/or external to the online system 130, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

Content published by the online system 130, e.g., as provided by content providers 150, is presented to and viewed by users of the online system 130, via their user client device 110. Presentation and viewing of published content may constitute an "impression," and such impressions are stored in the impression store 217 of the online system 130. Published content, in one embodiment, may include an impression tracking pixel that records a user impression. A user impression may include a timestamp, i.e., a record of the date and time at which the content was viewed by the user. Impression data may also include one or more user interaction events, wherein an online system 130 user performs some action in relation to the content they viewed. For example, a user interaction event with content may be clicking on the content or sharing content with connections stored in the edge store 225, which is discussed in more detail below. In one embodiment, purchases made after clicking on content may also be considered a user interaction event.

Impressions stored in the impression store 217 may be associated with relevant data, such as the associated content provider 150, as well as third-party and online system user identifiers associated with the user who saw the impression. FIG. 4 is an example of associated data that may be included with impression data.

Referring now to FIG. 4, it shows exemplary impression data 400, in one embodiment, stored with the associated third-party system user identifiers 410 and online system user identifiers 420 according to one embodiment. As shown in the example, impressions 430 also may be categorized by content provider identifier 405. Impression data on the online system 130 may include a plurality of content provider identifiers 405 and online system user identifiers 420 that do not match the third-party system user identifiers 410 communicated from the third-party attribution system 140. However, the most relevant impressions 430 to the third-party system 140, i.e., data for online system user identifiers 420 relating to third-party system user identifiers 410 and content provider identifiers 405, are determined. The relevant impressions 430 may be stored in the online system 130 impression store 217.

The identifier module 218 may be used by the online system 130 to match, or synchronize, a user visiting one or more content providers 150 with an online system user identifier 420. For example, a user visiting content provider 150 is assigned a third-party user identifier 410 by the third-party attribution system 140. The identifier module 218 matches the third-party user identifier assigned to the user with the online system identifier 420 assigned to the user, e.g., as described in conjunction with FIG. 3, step 335. In some embodiments, the identifier module 218 swaps out the online system user identifier associated with each impression for the third party user identifier, to maintain the online system's user identifiers as private, such that only the third-party attribution system user identifier is included in the impression data sent outside of the online system 130.

For the subset of users found to be a match between the third-party attribution system 140 and online system 130, the impressions module 219 may be used by the online system 130. The module 219 may determine which impressions, stored in a look-up table similar to the one shown in FIG. 4, e.g., in impression store 217, to determine those relevant to the matching users, as well as content providers 150. The impressions module 219 ultimately would produce a subset of relevant impressions.

Referring again to FIG. 2, the action log 220 may be used by the online system 130 to track user actions in the online system 130, particularly those that are associated with content tracked by the third-party attribution system 140. Users may interact with various objects in the online system 130, and information describing these interactions is stored in the action log 220. Examples of interactions with objects include: commenting on posts, sharing links, checking-in to physical locations via a mobile device, accessing content items, and any other suitable interactions. Additional examples of interactions with objects in the online system 130 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements in the online system 130 as well as with other applications operating in the online system 130. In some embodiments, data from the action log 220 is used to infer interests or preferences of a user, augmenting the interests included in the user's user profile and allowing a more complete understanding of user preferences.

The action log 220 also may store user actions taken on an external website and communicated to the online system 130. For example, an e-commerce website may recognize a user of an online system 130 through a social plug-in enabling the e-commerce 130 to identify the user of the online system 130. Because users of the online system 130 are uniquely identifiable, e-commerce websites, such as in the preceding example, may communicate information about a user's actions outside of the online system 130 to the online system 130 for association with the user. Hence, the action log 220 may record information about actions users perform on an external system, including webpage viewing histories, advertisements that were engaged, purchases made, and other patterns from shopping and buying. Additionally, actions a user performs that are associated with the third-party attribution system 140 executing on a client device 110 may be communicated to the action logger 215 for storing in the action log 220 by the application for recordation and association with the user by the online system 130.

The edge store 225 stores information describing connections between users and other objects in the online system 130 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 130, such as expressing interest in a page in the online system 130, sharing a link with other users of the online system 130, and commenting on posts made by other users of the online system 130.

An edge may include various features each representing characteristics of interactions between users, interactions between users and objects, or interactions between objects, according to one embodiment. For example, features included in an edge describe rate of interaction between two users, how recently two users have interacted with each other, the rate or amount of information retrieved by one user about an object, or the number and types of comments posted by a user about an object. The features also may represent information describing a particular object or user. For example, a feature may represent the level of interest that a user has in a particular topic, the rate at which the user logs into the online system 130, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 130 over time to approximate a user's interest in an object or in another user in the online system 130 based on the actions performed by the user. A user's affinity may be computed by the online system 130 over time to approximate a user's interest in an object, a topic, or another user in the online system 130 based on actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The user interface module 280 generates a user interface in which one or more content items selected for presentation to a user of the online system 130 are presented. The user interface may include a feed of content items. For example, the user interface may include a newsfeed that includes one or more advertisements. The user interface also may include a set of interactive elements (e.g., buttons) that each correspond to an option associated with a content item that may be selected by a user. Examples of options include an option to express a preference for a content item, an option to share the content item with additional online system users, and an option to comment on the content item. For example, if an online system user presented with a content item clicks on a button corresponding to an option to express a preference for the content item, other online system users to whom the user is connected may receive a notification that the user has expressed a preference for the content item.

The web server 285 links the online system 130 via the network 120 to the one or more client devices 110, as well as to the third-party attribution system 140. The web server 285 serves web pages, as well as other content, such as JAVA®, FLASH®, XML and so forth. The web server 285 may receive and route messages between the online system 140 and the client device 110, for example, instant messages, queued messages (e.g., email), text messages, short message service (SMS) messages, or messages sent using any other suitable messaging technique. A user may send a request to the web server 285 to upload information (e.g., images or videos) that are stored in the content store 210. Additionally, the web server 285 may provide application programming interface (API) functionality to send data directly to native client device operating systems, such as IOS®, ANDROID™, WEBOS® or BlackberryOS.

PROVIDING IMPRESSION INFORMATION To ATTRIBUTION SYSTEMS USING SYNCHRONIZED USER IDENTIFIERS

Figure 3:
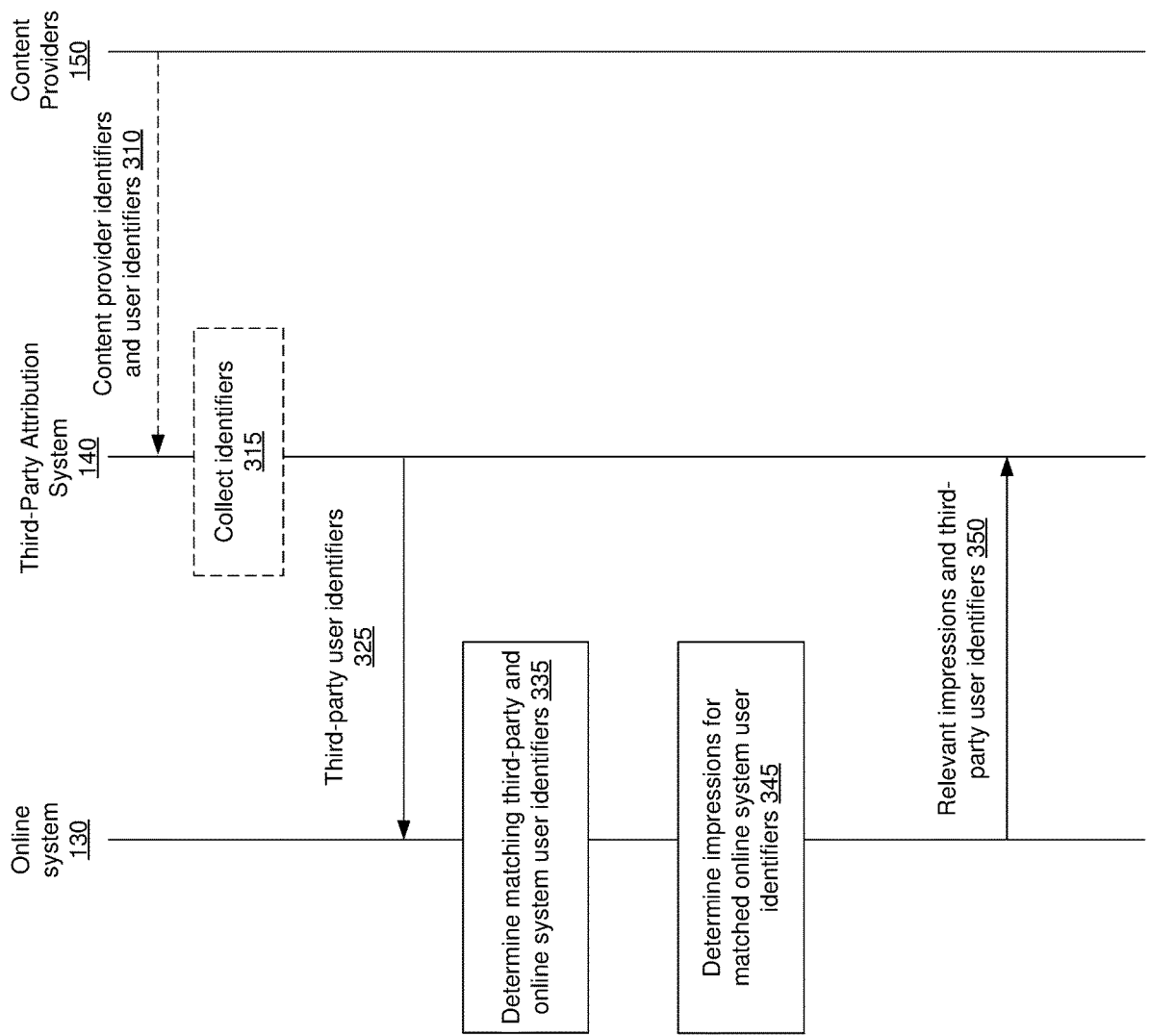
FIG. 3 is a flowchart illustrating a method for providing impression information to attribution systems using synchronized user identifiers, according to an embodiment of the invention.

FIG. 3 is a flowchart for providing impression information to attribution systems using synchronized user identifiers, according to an embodiment of the invention. FIG. 3 also shows the interaction if the entities involved in the method.

As a pre-step in the method, a user, e.g., a user of a user device 110, performing one or more user action events at a content provider 150. The user action event at the content provider 150 could be any online or offline action associated with a content provider 150, such as a user visiting or making a purchase at the content provider's physical location, for example a merchant's retail location, or any online activity such as a click, purchase, site visit, etc. associated with the content provider 150. Following the visit, the content provider 150 provides 310 its user identifier associated with the user action event to the third-party attribution system 140. These pre-steps are described herein as if only one user had a user action event at one content provider 150, but in actuality multiple user action events would occur by many users, and across several merchants. The content provider user identifiers can be sent to the third party attribution system 140 as the actions occur, or in batches.

The third-party attribution system 140 may collect 315 the user identification information received, and may store it with information about the content provider 150 from which it was received, before sending a list of the collected identifiers to the online system 130. In some embodiments, the user identifiers are provided to the online system as a hashed list of the received user identifiers from the content provider 150, and in other embodiments, the third-party attribution system 140 assigns its own unique identifiers.

The method for providing impression information to attribution systems using synchronized user identifiers begins when the online system 130 receives 325 the third party user identifiers from the third-party attribution system. After receiving 325 the third party user identifiers from the third-party attribution system 140, the online system 130 synchronizes, or determines 335 user matches, between the third-party user identifiers and online system user identifiers. For example, the online system 130 may determine 335, e.g., based on the user profile store 205, which of its users match up to the received third party user identifiers. In one embodiment, the identifier module 218 performs this matching. The matching 335 may be done online or offline. In some embodiments, not all received third party user identifiers will have matching online system user identifiers, e.g., because the associated user does not have a profile on the online system 130, or because the online system 130 does not have sufficient information to determine from the third party user identifier that there is a match on the online system 130.

Once the online system 130 determines 335 the matching online system identifiers, it uses those to determine 345 a plurality of relevant impressions associated with those matching online system identifiers, e.g., from impression store 217. In one embodiment, the impressions module 219 performs this function.

Figure 5:
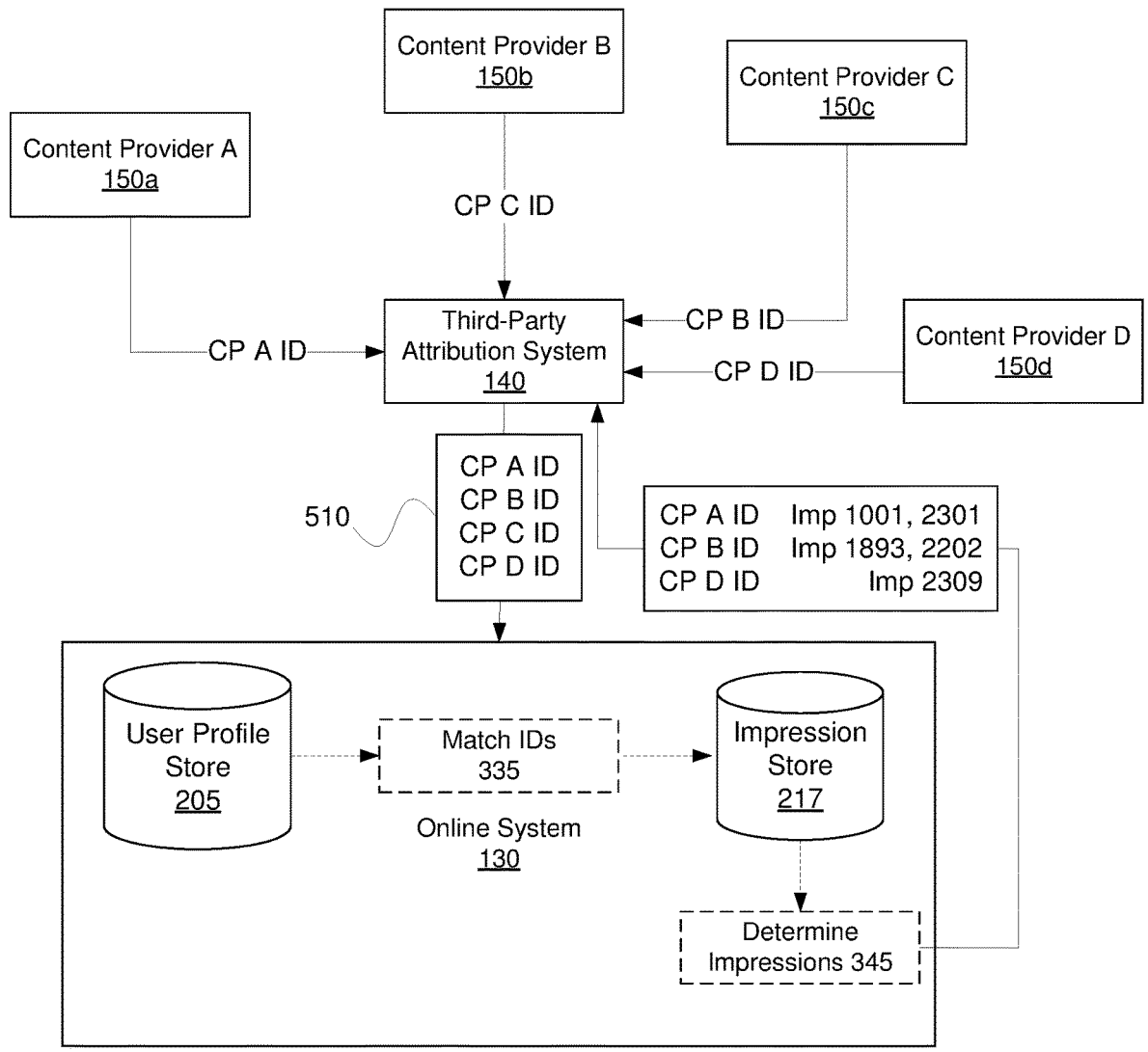
FIG. 5 is a flow diagram showing an example of the method using the data from FIG. 4, according to one embodiment.

There are various ways of defining which impressions are considered relevant impressions. According to some embodiments, when the third party user identifiers are received 325, information is also received indicating the content provider(s) 150 that were the source of the user action events that led to the third-party attribution system 140 sending its identifiers. For example, in some cases it might be only the impressions for a single content provider 150. However, this would limit the impression information ultimately returned to the third-party attribution system 140, and thus could limit its usefulness. In another embodiment, the relevant impressions could represent all impressions corresponding to the content providers 150 corresponding to the third-party user identifiers received. This would provide a greater match rate to the user impressions, and ultimately would provide the third-party attribution system 140 a larger set of impression data that would not result from considering the impression data of each content provider individually. FIG. 5, discussed below, provides an example of how this larger set of impression data would result. As a result, the determination 345 of relevant user impressions may further include determining a subset of all of the impressions for the matched online system users, or filtering the determined set based on the source content provider 150. In yet another embodiment, the online system 130 could disregard entirely which content provider 150 is associated with the received list of third party user identifiers, and determine all impression data, regardless of any relationship to a content provider 150.

Once the relevant impressions are determined 345, they are then sent 350 to the third-party attribution system 140 along with the third-party attributions system's own third party user identifiers, and a timestamp associated with each of the impressions. In some embodiments, when sending 350 the relevant impressions to the third-party attribution system 140, the online system 130 may remove or not include the online system user identifier associated with each impression, to maintain the online system's user identifiers as private, such that only the third-party attribution system 140 user identifier is included in the sent impression data. Referring again to FIG. 4, this means the impression data sent 345 would include the information in columns a and c (and possibly d), but not column b (online system 130 user identifier).

Removing these online system user identifiers allows greater privacy for the online system 130, while providing the third-party attribution system 140 data relevant to a larger set of impressions.

FIG. 5 is a flow diagram showing an example of the method using the data from FIG. 4, according to one embodiment. Corresponding to FIG. 3 step 310, content providers 150*a*-150*d* provide content identifiers to the third-party attribution system 140 (CP A ID, CP B ID, CP C ID, CP D ID). Only one identifier per content provider 150 is shown for illustrative purposes, but in some embodiments there would be more than one. Then, corresponding to step 315, the third-party attribution system 140 collects the list and provides it to the online system 130, shown in FIG. 5 as 510. The online system 130 receives 325 the list of third party user identifiers 410, shown in column a of FIG. 4.

Next, corresponding to step 335, the online system 130 determines, which of these third party user identifiers 410 match up with known online system user identifiers 420, shown in column b of FIG. 4. As can be seen, CP A ID corresponds to online system user identifier abc, CP B ID corresponds to online system user identifier def, and CP D ID corresponds to online system user identifier ghi, but no match was found for CP C ID (column b shows N/A).

Next, corresponding to step 335, the online system finds relevant impressions 430 corresponding to the determined online system user identifiers. In the example of FIG. 4 (column c), online user identifier abc has two impressions (1001, 2301), online user identifier def has two impressions (1893, 2202), and online user identifier ghi has one impression (2309). FIG. 4 also shows the content provider 150 associated with the impression in the online system 130 in column d. In this example, had the third-party attribution system 140 only supplied third party user identifiers corresponding to a single content provider 150, fewer of these impressions would have resulted. For example, if the content provider 150 was limited to 150*a*, only impressions 1001 and 2309 (rows 1 and 6) would have been in the determined impressions.

If the relevant impressions corresponded to the content providers 150 who were the source of the third party user identifier (150*a*-150*d*), each of the impressions except for 2202 would have been determined. The greater return of impressions can be seen in this case, for example, in impression 2301, which impression corresponds to content provider 150*d*, even though the third party user identifier had content provider 150*a* as its source. Likewise, impression 2309, which impression corresponds to content provider 150*a*, even though the third party user identifier had content provider 150*d* as its source. Neither of these impressions would have been in the determined impression set if the third party user identifiers were sent separately for each of the content providers 150*a*-150*d* instead of as a group.

In a final example, impression 2202 would only be in the result set if the relevant impressions were deemed to be any impression, regardless of whether the associated content provider was in the set of sources for the third party user identifiers, since it came from content source 150*e* (not in 150*a*-150*d*).

Finally, corresponding to step 345, the impressions deemed relevant are sent to the third party attribution system 140, along with its third party user identifiers. In the example of FIG. 5, this set includes impressions 1001, 2301 (sourced from CP A ID), impressions 1893, 2202 (sourced from CP B ID), and impressions 2309 (sourced from CP D ID). In this step, the online system 130 may send only columns a and c to the third-party attribution system 140, keeping private its online system user identifiers 420 (column b).

SUMMARY

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments also may relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A computer-implemented method, comprising:
receiving a list of third party user identifiers from a third party attribution system, the received third party user identifiers associated with one or more user action events by each of a plurality of users at a plurality of content providers;
determining online system user identifiers that match to at least a subset of the received third party user identifiers;
determining a plurality of relevant impressions in the online system corresponding to the matching online system user identifiers;
sending, to the third party attribution system, the determined plurality of relevant impressions and the associated subset of the third party user identifiers based on the corresponding online system user identifiers, wherein the online system user identifiers are not sent to the third party attribution system.

2. The computer-implemented method of claim 1, wherein the user action events by the plurality of users comprise any online or offline action associated with one of the plurality of content providers.

3. The computer-implemented method of claim 2, wherein an online action comprises including an impression tracking pixel in the content.

4. The computer-implemented method of claim 1, wherein the third party attribution system creates the list of third party user identifiers based on information received from the plurality of content providers about the user action events, and further comprises providing a hash of the list to the online system.

5. The computer-implemented method of claim 1, wherein content provider source information is received with associated third party user identifiers and wherein the relevant impressions are the subset of impressions associated with the content provider source information.

6. The computer-implemented method of claim 1, wherein the plurality of content providers comprises a first content provider and a second content provider, and wherein at least one impression sourced from a third party user identifier sourced from the first content provider is an impression associated with the second content provider.

7. The computer-implemented method of claim 1, wherein an impression comprises a timestamp and user interaction event.

8. The computer-implemented method of claim 1, wherein determining online system user identifiers that match to at least a subset of the received third party user identifiers occurs offline.

9. A non-transitory computer-readable storage medium storing executable instructions that when executed by a processor perform actions comprising:
receiving a list of third party user identifiers from a third party attribution system, the received third party user identifiers associated with one or more user action events by each of a plurality of users at a plurality of content providers;
determining online system user identifiers that match to at least a subset of the received third party user identifiers;
determining a plurality of relevant impressions in the online system corresponding to the matching online system user identifiers;
sending, to the third party attribution system, the determined plurality of relevant impressions and the associated subset of the third party user identifiers based on the corresponding online system user identifiers, wherein the online system user identifiers are not sent to the third party attribution system.

10. The non-transitory computer-readable storage medium of claim 9,
wherein the user action events by the plurality of users comprise any online or offline action associated with one of the plurality of content providers.

11. The non-transitory computer-readable storage medium of claim 10,
wherein content provider source information is received with associated third party user identifiers and wherein the relevant impressions are the subset of impressions associated with the content provider source information.

12. The non-transitory computer-readable storage medium of claim 10,
wherein the plurality of content providers comprises a first content provider and a second content provider, and wherein at least one impression sourced from a third party user identifier sourced from the first content provider is an impression associated with the second content provider.

13. The non-transitory computer-readable storage medium of claim 10,
wherein an impression comprises a timestamp and user interaction event.

14. The non-transitory computer-readable storage medium of claim 10,
wherein determining online system user identifiers that match to at least a subset of the received third party user identifiers occurs offline.

15. A computer system comprising:
a computer processor; and
a non-transitory computer-readable storage medium storing executable instructions that when executed by the computer processor perform actions comprising:
receiving a list of third party user identifiers from a third party attribution system, the received third party user identifiers associated with one or more user action events by each of a plurality of users at a plurality of content providers;
determining online system user identifiers that match to at least a subset of the received third party user identifiers;
determining a plurality of relevant impressions in the online system corresponding to the matching online system user identifiers;
sending, to the third party attribution system, the determined plurality of relevant impressions and the associated subset of the third party user identifiers based on the corresponding online system user identifiers, wherein the online system user identifiers are not sent to the third party attribution system.

16. The computer system of claim 15, wherein the user action events by the plurality of users comprise any online or offline action associated with one of the plurality of content providers.

17. The computer system of claim 15, wherein content provider source information is received with associated third party user identifiers and wherein the relevant impressions are the subset of impressions associated with the content provider source information.

18. The computer system of claim 15, wherein the plurality of content providers comprises a first content provider and a second content provider, and wherein at least one impression sourced from a third party user identifier sourced from the first content provider is an impression associated with the second content provider.

19. The computer system of claim 15, wherein an impression comprises a timestamp and user interaction event.

20. The computer system of claim 15, wherein determining online system user identifiers that match to at least a subset of the received third party user identifiers occurs offline.

* * * * *